United States Patent [19]

Heitzmann

[11] Patent Number: 5,732,970
[45] Date of Patent: Mar. 31, 1998

[54] MODULAR TRAILER WHEEL SUSPENSION

[75] Inventor: David E. Heitzmann, Union, Mich.

[73] Assignee: MOR/ryde International, Inc., Elkhart, Ind.

[21] Appl. No.: 533,555

[22] Filed: Sep. 25, 1995

[51] Int. Cl.⁶ ................................................. B60G 11/22
[52] U.S. Cl. ........................ 280/717; 267/140.2; 280/716
[58] Field of Search ................................. 280/717, 716, 280/715, 688; 267/140.2

[56] References Cited

U.S. PATENT DOCUMENTS

| | | | |
|---|---|---|---|
| 2,706,113 | 4/1955 | Hickman | 267/21 |
| 2,758,832 | 8/1956 | Hickman | 280/717 |
| 3,069,149 | 12/1962 | Neff | 267/33 |
| 3,120,952 | 2/1964 | Hendrickson | 267/21 |
| 3,482,852 | 12/1969 | Hickman | 280/124 |
| 3,495,848 | 2/1970 | Hickman | 280/124 |
| 3,547,215 | 12/1970 | Bird | 180/71 |
| 3,692,326 | 9/1972 | Hickman | 280/717 |
| 3,737,174 | 6/1973 | Hickman | 280/717 |
| 3,817,551 | 6/1974 | Moore | 280/104.5 |
| 3,994,512 | 11/1976 | Parker et al. | 280/687 |
| 4,213,633 | 7/1980 | Moore | 280/716 |
| 4,465,298 | 8/1984 | Raidel, Sr. | 280/711 |
| 4,902,035 | 2/1990 | Raidel | 280/713 |
| 4,995,636 | 2/1991 | Hall et al. | 180/716 |
| 5,150,918 | 9/1992 | Heitzmann | 280/716 |
| 5,465,997 | 11/1995 | Heitzmann | 280/716 |
| 5,492,314 | 2/1996 | Drennen | 267/140.2 |

FOREIGN PATENT DOCUMENTS 2846608   5/1979   Germany ............................ 280/716

*Primary Examiner*—Eric D. Culbreth
*Attorney, Agent, or Firm*—Joseph P. Gastel

[57] ABSTRACT

A modular rubber spring suspension including a hanger having a vertical plate extending downwardly from a horizontal plate, a rubber spring, a first side on the rubber spring secured to the vertical plate, a beam having first and second ends and a central portion therebetween, a second side on the spring secured to the first end of the beam, and a fulcrum mounted on the horizontal plate and mounting the central portion of the beam.

23 Claims, 4 Drawing Sheets

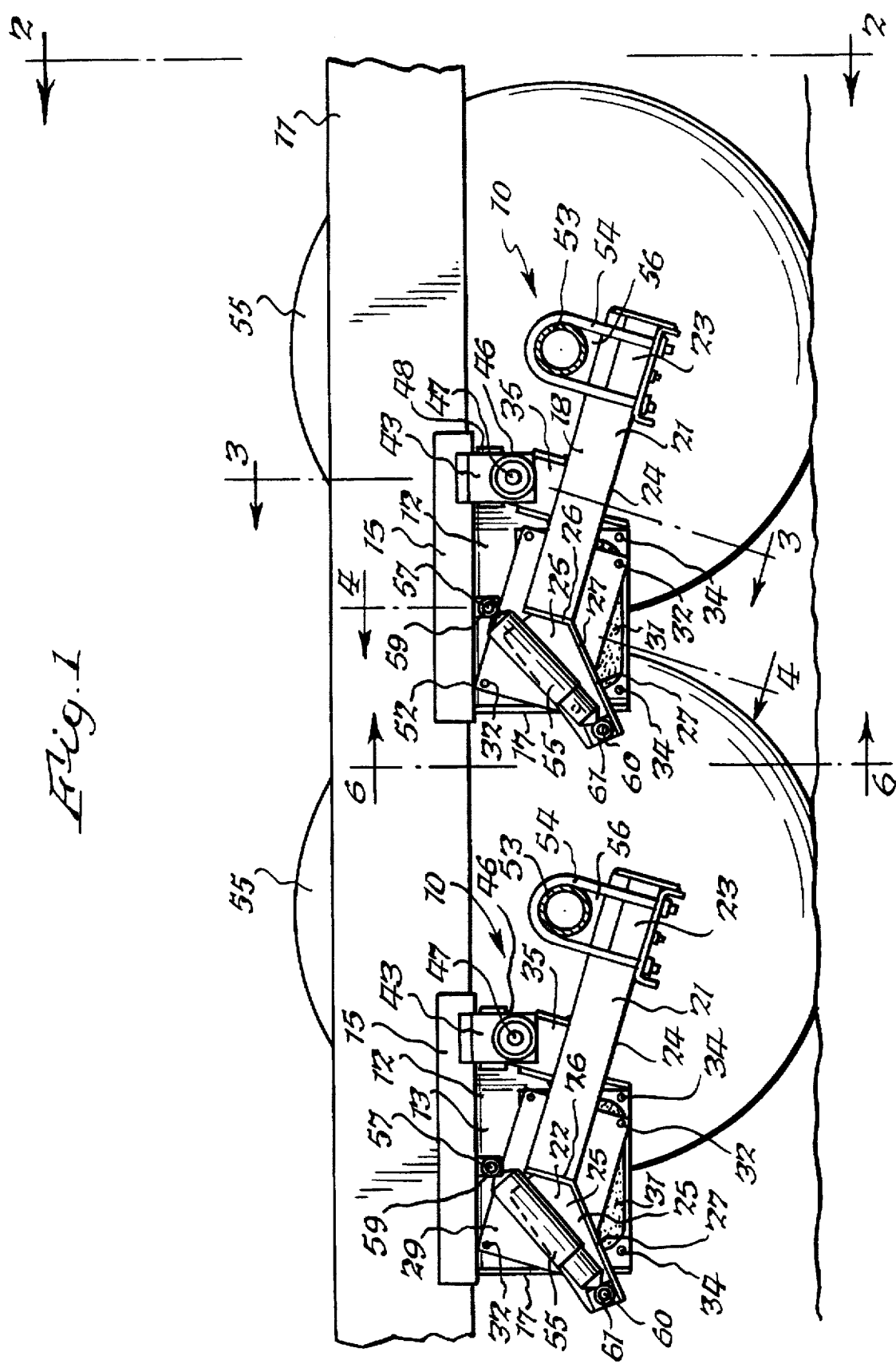

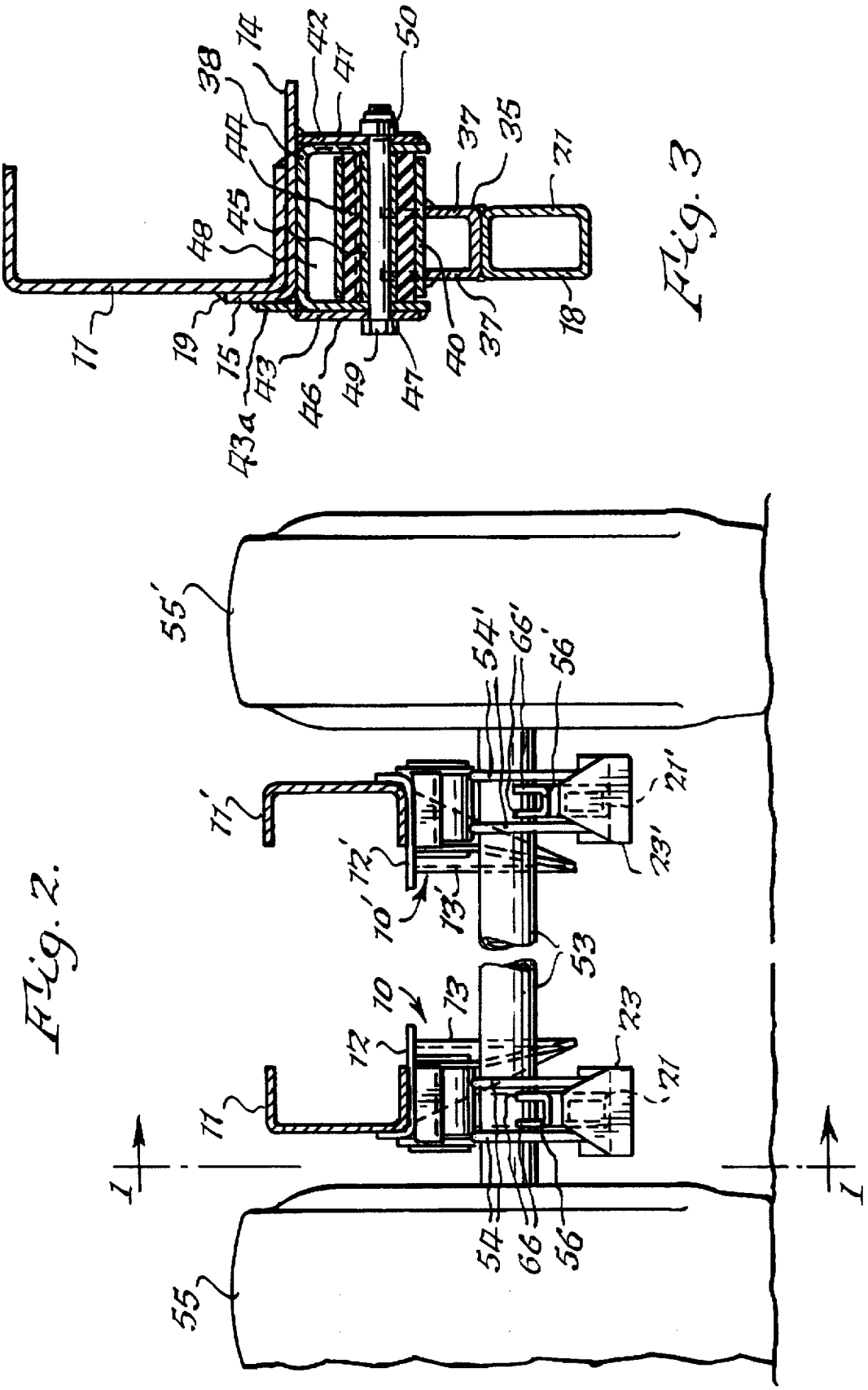

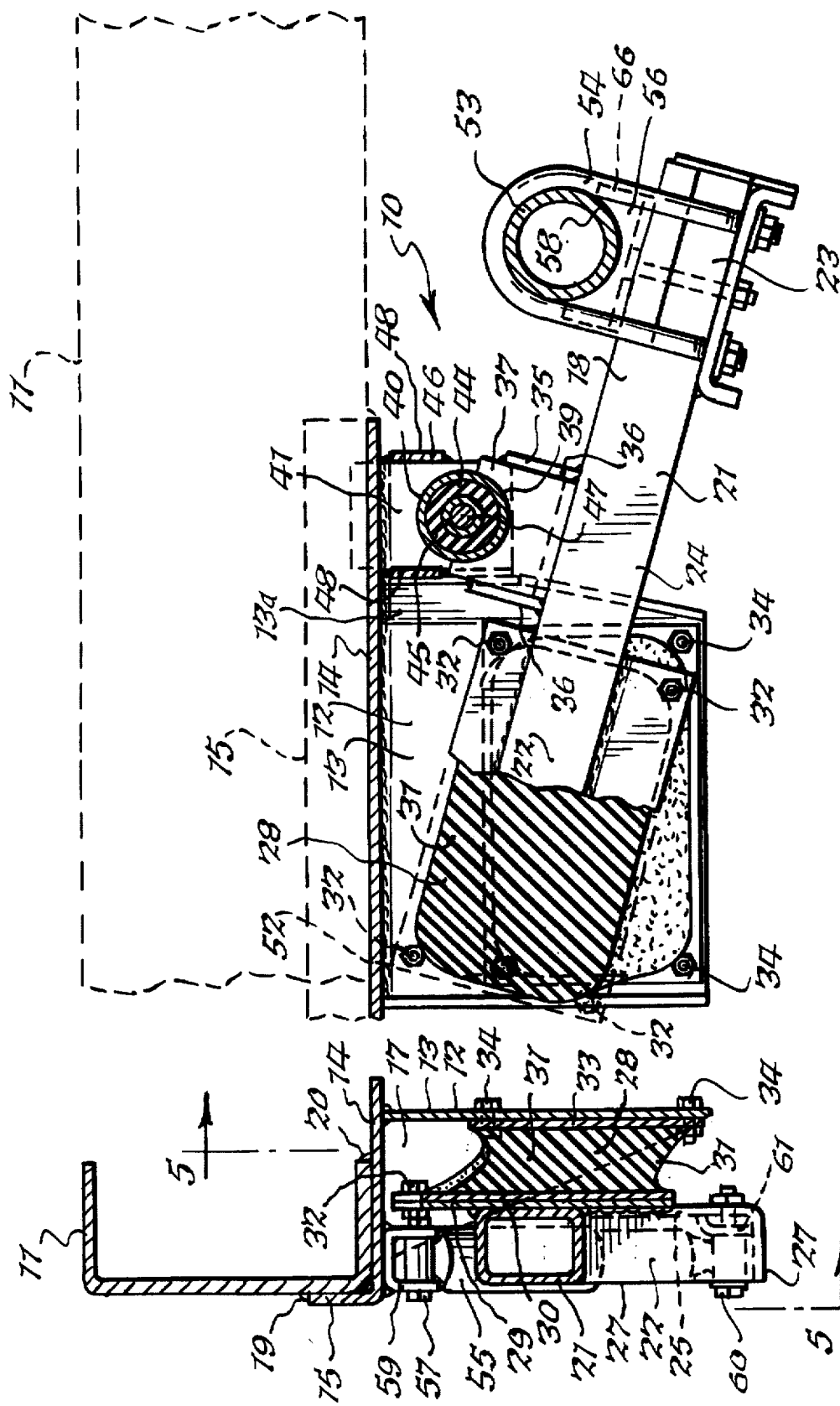

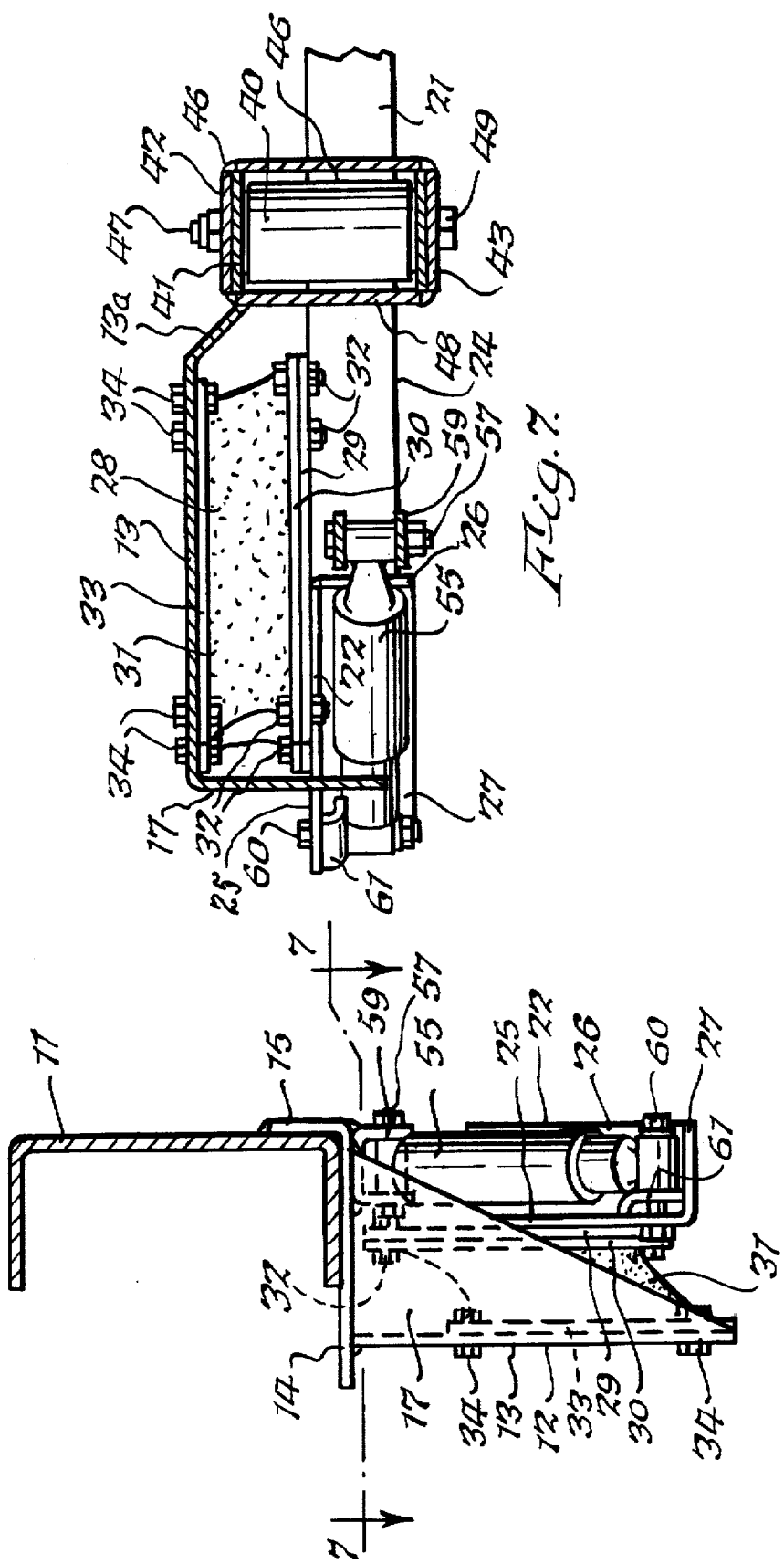

MODULAR TRAILER WHEEL SUSPENSION

BACKGROUND OF THE INVENTION

The present invention relates to a self-contained modular rubber spring suspension for a trailer.

By way of background, insofar as known, in the past there have been no modular rubber spring suspensions wherein the beam which supports an axle at one end has a rubber spring mounted in shear at its other end and a fulcrum at its central portion. In the past the fulcrum was at the end of the beam and the rubber spring was generally at the central portion. This arrangement required a relatively large amount of rubber to perform the spring function because the rubber spring could not be prestressed prior to mounting the spring assembly on the frame of a vehicle.

SUMMARY OF THE INVENTION

It is accordingly one object of the present invention to provide a completely self-contained modular rubber spring suspension having a prestressed rubber spring therein and which can be mounted as a unit on the frame of a vehicle.

Another object of the present invention is to provide an improved rubber spring suspension which utilizes a prestressed rubber member, thereby lessening the amount of rubber to perform a desired spring function. Other objects and attendant advantages of the present invention will readily be perceived hereafter.

The present invention relates to a modular rubber spring suspension comprising a hanger, a rubber spring, a first side on said rubber spring secured to said hanger, a beam having first and second ends and a central portion therebetween, a second side on said spring secured to said first end of said beam, and a fulcrum mounted on said hanger and mounting said central portion of said beam.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view taken substantially along line 1—1 of FIG. 2 and showing a vehicle frame mounting a plurality of trailer wheel suspensions of the present invention;

FIG. 2 is a fragmentary cross sectional view taken substantially along line 2—2 of FIG. 1;

FIG. 3 is a cross sectional view taken substantially along line 3—3 of FIG. 1 and showing the fulcrum of the suspension;

FIG. 4 is a cross sectional view taken substantially along line 4—4 of FIG. 1 and showing the rubber spring mounted on the hanger;

FIG. 5 is a fragmentary cross sectional view taken substantially along line 5—5 of FIG. 4 and showing the wheel suspension partially in elevation and partially in cross section;

FIG. 6 is a fragmentary cross sectional view taken substantially along line 6—6 of FIG. 1; and FIG. 7 is a fragmentary cross sectional view taken substantially along line 7—7 of FIG. 6.

DESCRIPTION OF THE PREFERRED EMBODIMENTS

By way of brief introduction, the improved modular wheel suspension 10 is a fully self-contained spring suspension which can be mounted on a vehicle frame as original equipment or which can be mounted on a vehicle frame to replace any other type of suspension. Furthermore, the rubber spring suspension is self-contained and modular, and the rubber spring portion thereof is prestressed to thereby save rubber material and provide a relatively firm ride.

In FIGS. 1 and 2 a plurality of rubber spring assemblies 10 and 10' are shown as mounted on each of frame members 11 and 11', respectively, of a trailer. At this point it will be appreciated that as many spring assemblies 10 and 10' as desired can be mounted on each frame member 11 and 11', respectively. Thus, depending on the size of the trailer, each side may mount one or two spring assemblies, or possibly more. As can be seen from FIG. 2, the structure of the spring assemblies mounted on frame member 11' and designated by primed numerals are mirror image counterparts of the spring assembly 10 and structure designated by unprimed numerals, and the latter will subsequently be described.

Each spring assembly 10 includes a hanger 12 having a vertical hanger portion 13 in the form of a plate welded to and extending downwardly from a horizontal frame portion 14 in the form of a plate having a flange 15 at its end. A triangular gusset 17 (FIG. 6) is welded between both vertical hanger portion 13 and horizontal hanger portion 14. The quadrilateral portion 13a of plate 13a opposite to gusset 17 is inclined to the remainder of the plate (FIGS. 5 and 7). As can be seen from FIG. 4, the horizontal hanger portion 14 is welded to frame member 11 along flange edge 19 and frame member edge 20 to thereby securely bond hanger 12 to frame member 11.

A beam 21 which is mostly in the form of a hollow rectangular tubular member 18 (FIG. 3) is mounted on hanger 12. More specifically, beam 21 includes a first end 22 and a second end 23 and a central portion 24 therebetween. The first end 22 comprises a plate 25 (FIG. 1) having a flange 27 and a flange 26 which is welded to the end of tubular member 18. Tubular member 18 of beam 21 and plate 25 are welded to plate 29 (FIGS. 1 and 7). Plate 29 in turn is secured to plate 30 of rubber spring 28 by a plurality of bolts 32 (FIGS. 4 and 7). Rubber spring 28 consists of plates 30 and 33 bonded to rubber member 31 in the conventional manner. The second plate 33 of rubber spring 28 (FIG. 4) is secured at its four corners to vertical plate 13 of hanger 12 by means of a plurality of bolts 34.

A fulcrum 46 is provided at the central portion 24 of beam 21. In this respect, a central beam extension 35 of U-shaped cross section (FIG. 3) is welded to the upper surface of beam 21 proximate the central portion 24 thereof. U-shaped member 35 has upstanding legs 37 which are cut away at 39 (FIG. 5) to form arcs to which cylindrical sleeve 40 is welded (FIG. 3). Plates 36 are welded across the legs of a U-shaped member 35. A hanger bracket 41 consists of a channel 38 (FIG. 3) welded to horizontal hanger member 14. A pair of spaced plates 42 and 43 are welded as shown to horizontal hanger member 14 and flange 15, respectively, and a pair of plates 48 (FIG. 5) are welded across the legs of or U-shaped member 38 for reinforcement of the latter. An additional plate 43a is welded (FIG. 3) at the junction of plate 43, channel 38 and flange 15, although in certain instances, where channel 38 is narrower, plate 43a can be omitted and plate 43 can be extended onto flange 15. A rubber bushing 44 is contained within sleeve 40 and a second cylindrical sleeve 45 is contained within cylindrical bushing 44. A bolt 47 extends through inner sleeve 44, and the head 49 of bolt 47 effectively bears against plate 43 and the nut 50 on bolt 47 bears against plate 41. It is in this manner that the central portion 24 of beam 21 is pivotally mounted on hanger 12.

Thus, the first end 22 of beam 21 is mounted on the vertical plate 13 of hanger 12 by rubber spring 28, and the central portion 24 of beam 21 is pivotally mounted on horizontal plate 14 of hanger 12.

At this point it is to be noted that the rubber member 31 of spring 28 is prestressed in a counterclockwise direction in FIGS. 1 and 5. Thus, it is biased to rotate the beam 21 about fulcrum 46 in a clockwise direction. However, the upper corners of plates 29 and 30 at 52 (FIGS. 1 and 5) will bear against horizontal hanger plate 14 when there is no weight on frame member 11 thereby limiting the clockwise rotation of beam 21 about bolt 47 of fulcrum 46. However, when there is a weight on frame member 11, spring member 31 will be stressed and beam 21 will be pivoted in a counterclockwise direction. In FIG. 1, the spring assemblies 10 are shown in an unloaded position.

The second end 23 of beam 21 can mount an axle 53 by means of a pair of U-bolts 54, and a wheel 55 is mounted on axle 53. More specifically, U-shaped bracket member 56 (FIGS. 2 and 5) is welded to beam end 23, and arcuate cutouts 58 (FIG. 5) in the legs 66 of the U-shaped member 56 thereof receive axle 53.

A shock absorber 55 has its upper end pivotally mounted at 57 on U-shaped shock absorber bracket 59 which is welded to horizontal hanger portion 14. The opposite end of shock absorber 55 is pivotally mounted at 60 to bracket 61 mounted on plate 25 and flange 27. The shock absorber is constructed so as to resist clockwise movement of beam 21 about bolt 47 of fulcrum 46.

It can thus be seen that a modular spring assembly 10 has been provided containing a prestressed rubber spring and shock absorber and fulcrum all mounted on a hanger which can be welded to a frame member of a trailer. The prestressing of the rubber spring conserves the amount of rubber which is required for operation because the prestressing places the spring in a higher portion of its range before it is additionally loaded by its portion of the weight of the trailer.

While a preferred embodiment of the present invention has been disclosed, it will be appreciated that it is not limited thereto but may be otherwise embodied within the scope of the following claims.

What is claimed is:

1. A modular rubber spring suspension comprising a hanger, prestressed a rubber spring, a first side on said rubber spring secured to said hanger, a beam having first and second ends and a central portion therebetween, a second side on said spring secured to said first end of said beam, and a fulcrum mounted on said hanger and mounting said central portion of said beam.

2. A modular rubber spring suspension as set forth in claim 1 wherein said hanger includes a prestressed horizontal member and a vertical member depending downwardly therefrom, and wherein said first side of said rubber spring is mounted on said vertical member, and wherein said fulcrum is mounted on said horizontal member.

3. A modular rubber spring suspension as set forth in claim 2 wherein said fulcrum comprises a central extension extending upwardly from said central portion of said beam.

4. A modular rubber spring suspension as set forth in claim 3 wherein said rubber spring includes a rubber member, a first plate mounted on one side of said rubber member and secured to said vertical member, and a second plate mounted on the opposite side of said rubber member and secured to said first end of said beam.

5. A modular rubber spring suspension as set forth in claim 4 wherein said second plate includes a portion which bears on said horizontal member when there is no load on said suspension.

6. A modular rubber spring suspension as set forth in claim 1 wherein said rubber spring includes a rubber member, a first plate mounted on one side of said rubber member and secured to said hanger, and a second plate mounted on the opposite side of said rubber member and secured to said first end of said beam.

7. A modular rubber spring suspension as set forth in claim 6 wherein said hanger includes a horizontal member and a vertical member depending downwardly therefrom, and wherein said first side of said rubber spring is mounted on said vertical member, and wherein said fulcrum is mounted on said horizontal member.

8. A modular rubber spring suspension as set forth in claim 7 wherein said fulcrum comprises a central extension extending upwardly from said central portion of said beam.

9. A modular rubber spring suspension as set forth in claim 1 wherein said fulcrum comprises a central extension extending upwardly from said central portion of said beam.

10. A modular rubber spring suspension as set forth in claim 9 wherein said hanger includes a horizontal member and a vertical member depending downwardly, and wherein said first side of said rubber spring is mounted on said vertical member, and wherein said fulcrum is mounted on said horizontal member.

11. A modular rubber spring suspension as set forth in claim 10 wherein said rubber spring includes a rubber member, a first plate mounted on one side of said rubber member and secured to said vertical member, and a second plate mounted on the opposite side of said rubber member and secured to said first end of said beam.

12. A modular rubber spring suspension as set forth in claim 1 including a shock absorber mounted between said hanger and said first end of said beam.

13. A modular rubber spring suspension as set forth in claim 12 wherein said shock absorber is constructed to resist upward movement of said first end of said beam.

14. A modular rubber spring suspension as set forth in claim 12 wherein said hanger includes a horizontal member and a vertical member depending downwardly, and wherein said first side of said rubber spring is mounted on said vertical member, and wherein said fulcrum is mounted on said horizontal member.

15. A modular rubber spring suspension as set forth in claim 14 wherein said rubber spring includes a rubber member, a first plate mounted on one side of said rubber member and secured to said vertical member, and a second plate mounted on the opposite side of said rubber member and secured to said first end of said beam.

16. A modular rubber spring suspension as set forth in claim 15 wherein said second plate includes a portion which bears on said horizontal member when there is no load on said suspension.

17. A modular rubber spring suspension as set forth in claim 16 wherein said fulcrum comprises a central extension extending upwardly from said central portion of said beam.

18. A modular rubber spring suspension comprising a hanger, a beam having first and second ends and a central portion therebetween, a fulcrum on said hanger mounting said central portion of said beam, and prestressed rubber spring means mounting said first end of said beam on said hanger.

19. A modular rubber spring suspension comprising a hanger including a horizontal hanger plate and a vertical hanger plate depending therefrom, a rubber spring including a rubber member bonded between first and second plates, said first plate being secured to said vertical hanger plate, a beam having first and second end portions and a central portion therebetween, a beam plate on a first end portion of said beam, said beam plate being secured to said second plate, a third plate bonded to said beam plate, a flange extending outwardly from said third plate, a first shock absorber mount on said flange, a second shock absorber mount on said horizontal hanger plate, a fulcrum between said horizontal hanger plate and said central portion of said beam, and an axle mounting structure on a second end portion of said beam.

20. A modular rubber spring suspension as set forth in claim 19 wherein said rubber member is prestressed, and wherein at least one of said beam plate and said second plate bear against said horizontal hanger plate when there is no load on said suspension.

21. A modular rubber spring suspension as set forth in claim 19 wherein said beam includes a tubular member, and a second flange on said beam plate bonded to said tubular member at said first end portion of said beam.

22. A modular rubber spring suspension as set forth in claim 21 wherein said fulcrum comprises an inverted U-shaped member having downwardly extending legs.

23. A modular rubber spring suspension as set forth in claim 22 wherein said fulcrum comprises a bolt extending through said downwardly extending legs, and a rubber bushing mounted on said bolt.

* * * * *

UNITED STATES PATENT AND TRADEMARK OFFICE
CERTIFICATE OF CORRECTION

PATENT NO. : 5,732,970
DATED : March 31, 1998
INVENTOR(S) : David E. Heitzmann

It is certified that error appears in the above-identified patent and that said Letters Patent is hereby corrected as shown below:

Column 2, line 25, after "plate" change "13a" to --13--;

line 45, change "at" to --proximate--;

line 46, before "U-shaped" insert --a--;

line 48, change "proximate" to --at--;

line 51, before "U-shaped" delete --a--;

line 52, after "channel" and before "38" insert --or U-shaped member--;

line 56, change "or U-shaped member" to --channel--.

Column 3, line 45 (claim 1), change "prestressed a" to --a prestressed--;

line 52 (claim 2), cancel "prestressed".

Column 6, line 4 (claim 21), change "19" to --20--.

Signed and Sealed this

Twenty-third Day of June, 1998

Attest:

BRUCE LEHMAN

Attesting Officer     Commissioner of Patents and Trademarks